United States Patent [19]

Seewi et al.

[11] Patent Number: 5,178,893

[45] Date of Patent: Jan. 12, 1993

[54] PRODUCT AND PROCESS OF MAKING A ROOM TEMPERATURE STORAGE STABLE DOUGH

[75] Inventors: Gila Seewi; Johannes Schupp, both of Heilbronn-Bockingen; Irmtraud Wildfeuer, Flein; Hans Bohrmann, Talheim, all of Fed. Rep. of Germany

[73] Assignee: CPC International Inc., Englewood Cliffs, N.J.

[21] Appl. No.: 821,343

[22] Filed: Jan. 13, 1992

Related U.S. Application Data

[63] Continuation of Ser. No. 137,634, Dec. 24, 1987, abandoned.

[30] Foreign Application Priority Data

Jan. 9, 1987 [DE] Fed. Rep. of Germany ....... 3700515

[51] Int. Cl.$^5$ .............................................. A21D 6/00
[52] U.S. Cl. .................................. 426/549; 426/520; 426/555; 426/556
[58] Field of Search ............... 426/321, 331, 549, 555, 426/556, 520

[56] References Cited

U.S. PATENT DOCUMENTS

| | | | |
|---|---|---|---|
| 2,285,065 | 6/1942 | Taylor | 426/331 |
| 3,257,213 | 6/1966 | Colby | 426/556 |
| 3,492,127 | 1/1970 | Ketch et al. | 426/556 |
| 3,792,176 | 2/1974 | Van Patten et al. | 426/556 |
| 4,252,834 | 2/1981 | Inamine et al. | 426/321 |
| 4,291,065 | 9/1981 | Zobel et al. | 426/321 |
| 4,511,585 | 4/1985 | Durst | 426/106 |
| 4,568,551 | 2/1986 | Seewi et al. | 426/99 |
| 4,624,856 | 11/1986 | Vanderveer et al. | 426/331 |

OTHER PUBLICATIONS

H. K. Leung et al.: "Storage Stability of a Puff Pastry Dough with Reduced Water Activity", Journal of Food Science, vol. 49 (1984), pp. 1405–1409.

*Primary Examiner*—Jeanette Hunter
*Assistant Examiner*—Helen Pratt

[57] ABSTRACT

A ready-to-bake dough which is storage stable at room temperature comprises flour, edible fat, texturizer and a controlled amount, particularly 8–20% by weight, of water. When the dough is prepared, the flour and fat are pretreated by forming an essentially homogeneous premix. The premix is further processed by adding water and heating, or by heating under pressure with or without the addition of water. The dough can be used to make bread, cookies, biscuits, pastries and the like.

19 Claims, No Drawings

PRODUCT AND PROCESS OF MAKING A ROOM TEMPERATURE STORAGE STABLE DOUGH

This application is a continuation of application Ser. No. 07/137,634, filed 12-24-87, now abandoned.

FIELD OF THE INVENTION

The present invention relates to a ready-to-bake dough which is storage stable at room temperature for at least twelve months.

BACKGROUND OF THE INVENTION

Baking dough prepared in the home or by chefs is generally a mixture of flour, fat and water which is kneaded together before baking. With the increasing popularity of convenience foods there has been a growing demand for a stable ready-mixed dough which does not require the time-consuming steps of blending, mixing and kneading before use.

An important consideration in formulating a ready-to-bake dough is storage stability. A considerable period of time may elapse after preparation by the manufacturer and purchase by the consumer. A further period of time may elapse before the consumer uses the product.

One method of preserving dough is through refrigeration. This is an acceptable approach, but has the disadvantages of requiring refrigeration space and equipment and also requiring the dough product to be thawed before use.

Another approach has been to try to make the dough stable at room temperature. Stability may, for example, be achieved by incorporating preservatives in the dough to prevent microbial attack. Another approach is to include additives such as polyhydric alcohols which, by lowering the water activity of the dough, impart stability. An example of this approach is disclosed in European Patent Application No. 145,550, published June 1985, wherein the ingredients of a storage-stable dough are selected to give the product a water activity of less than about 0.72.

A paper in the *Journal of Food Science*, Vol. 49 (1984) pp. 1405 to 1409 investigates the storage stability of puff pastry dough. A number of parameters were examined including varying the water content, and adding sorbitol, dough conditioner, potassium sorbate, gum arabic and butylated hydroxy anisole. In addition, the wheat flour used was modified by replacing it with flour which had been pretreated by heating to partially inactivate its enzyme activity.

The heat pretreatment was carried out at 148.9° C. for 0, 20, 40 and 50 minutes, at 176.7° C. for 1, 5, 10, 20 and 30 minutes and at 204.4° C. for 0, 5, 10, 15 and 20 minutes. The investigators found that the lipoxygenase activity decreased rapidly during the first 20 minutes at all three temperatures but that the alpha-amylase was more heat resistant. Even the most severe heating for 20 minutes at 204.4° C. caused only about a 70% decrease in amylase activity. The investigators also noted that the heat pretreatment had an adverse effect on the baking properties of the flour, attributed to denaturation of the wheat gluten.

The overall conclusion of the experimental program was that a puff pastry dough could be produced with a water activity of 0.9 by adding 12% sorbitol and a dough conditioner, and by using a flour heat treated at 176.7° C. for 10 minutes. The heat-treated flour contained 6% water by weight and the total puff pastry dough composition was 20.5% water by weight. Storage tests indicated that the product was stable against microbiological spoilage or oxidative rancidity at 5° C. and 15° C. At the higher storage temperature, however, loss in baking quality was observed. This was attributed to partial melting of the puff pastry margarine.

It has been found that a storage-stable dough can be obtained wherein stability is achieved by using a mixture of fat and flour which has been exposed to heat pretreatment under carefully controlled moisture conditions thereby minimizing the loss in baking quality of the dough.

In European Patent Application No. 112,504 (equivalent to U.S. Pat. No. 4,568,551) a dehydrated base product is disclosed for making thickened sauces and soups, which are dispersible in hot water without forming lumps. The process comprises premixing a starch material such as wheat flour with an optionally liquified, edible fat. The premix is then heated to an elevated temperature after adding 0.5 to 15 w/w % water or heated to an elevated temperature under elevated pressure, optionally without added water.

It has been found that a flour/fat mixture treated by heating under controlled conditions of temperature and moisture in a manner similar to that described in European Patent Application No. 112,504 can also be used as an ingredient of a storage-stable dough.

SUMMARY OF THE INVENTION

In accordance with the present invention, a ready-to-bake dough which is storage stable at room temperature is provided. The dough generally comprises flour, edible fat, texturizer and water. When the dough is prepared, the flour and fat are pretreated by forming an essentially homogeneous premix. The premix is further processed either by adding water and heating, or by heating under pressure with or without the addition of water. The dough can be used to make bread, cookies, biscuits, pastries and the like.

DETAILED DESCRIPTION OF THE INVENTION

The storage stable, ready-to-bake dough of the present invention comprises

| | |
|---|---|
| 15 to 60 w/w % | flour |
| 5 to 40 w/w % | edible fat |
| 5 to 35 w/w % | texturizer |
| 5 to 18 w/w % | water | in which the flour and fat are pretreated by forming an essentially homogeneous premix of flour and fat and a) adding about 0.5 to 15 w/w % water to the premix and heating the premix to an elevated temperature or b) heating the premix to an elevated temperature under elevated pressure with or without the addition of about 0.5 to 15 w/w % water.

The flour component of the dough according to the invention can be wheat, rye, rice or maize flour. Part of the flour, for example, up to 25 weight %, can be replaced by a cereal starch, for example, by wheat, maize or rice starch. The total amount of flour and starch in the dough is suitably about 20 to 60 w/w %, preferably about 25 to 57.5 w/w %.

Any fat of animal or vegetable origin can be used in formulating the dough. The fat should have a melting point low enough to impart a good taste to the dough but high enough to avoid processing difficulties. An emulsifier can be added to stabilize fats that are liquid or near liquid at processing and ambient storage temperature. The fat content of the dough can range from about 10 to 40% by weight, preferably about 15 to 37.5% by weight and most preferably about 17.5 to 35% by weight.

The texturizer is suitably a polyol, such as glycerol or a water soluble, optionally hydrogenated, monosaccharide, disaccharide or polysaccharide, having a degree of polymerization between 3 and 50. Examples of suitable texturizers include glycerol, glucose, fructose, sucrose, honey, glucose syrups, fructose syrups, starch hydrolysates containing oligomers up to 100 DP, as well as sorbitol, maltitol, and hydrogenated starch hydrolysates. The amount of the texturizing agent present in the dough can vary from about 10 to 35 w/w %, preferably about 12.5 to 32 w/w % and most preferably about 14 to 30 w/w %.

The water content of the product is limited to about 5 to 18 w/w % and is advantageously in the range of about 6 to 16 w/w % preferably in the range of about 7 to 15 w/w % and most preferably in the range of about 8 to 14 w/w %.

The ingredients of the dough product, particularly the texturizer, are preferably present in such quantities to ensure a water activity value of about 0.75 or less.

By "essentially homogeneous premix" is meant a mixture which is homogeneous when judged by baker's standards.

The premix can be heated gradually to the desired final elevated temperature which can range from about 90° to 145° C., preferably about 95 to 135° C. and most preferably about 100° to 120° C. Lower temperatures require impracticably long treatment times whereas higher temperatures tend to result in decomposition and discoloration of the products and poor baking qualities.

The duration of the heat treatment including the time to reach the desired temperature can vary within wide limits. This depends on a number of factors, for example, whether the treatment is batch or continuous. If the treatment is batch, it depends on the size of the batch, the rate of application of heat and the final temperature required. The time can vary generally between about 0.1 and 300 minutes. For a batch process with a gradual increase in temperature the time is usually between about 10 and 100 minutes. For a continuous process, which is preferred, the residence time is shorter than the corresponding batch time and can be between about 0.1 and 60 minutes, preferably between about 0.5 and 20 minutes, and most preferably between about 0.5 and 10 minutes.

The premix is preferably heated under elevated pressure without the addition of water. When the premix is heated to an elevated temperature under elevated pressure the elevated pressure can be that generated at the temperature in question when the premix is maintained under sealed conditions as in a batch process.

Alternatively, the pressure can be that under which the premix passes through a continuous apparatus. It has been found that a pressure of about 3 bar is suitable, but the optimum pressure will depend upon the apparatus, and should be chosen on a case by case basis bearing in mind that pressure that is too high may result in separation of the fat.

It is also advantageous to cool the heated premix with agitation in an inert gas, for example, in a nitrogen atmosphere.

Once the premix of flour and fat has been prepared, the blending of the premix with the other components of the storage-stable dough can be carried out by conventional means in an industrial mixer. Water may be added alone or as part of a sugar syrup or starch hydrolysate.

In addition to the essential ingredients described above, the dough can also contain optional components which improve quality, for example, milk solids and dried egg, or additives for making special products, (such as doughs containing particles of chocolate for making chocolate chip cookies). All ingredients of the dough such as salt, milk powder, dried egg, and the like, except the texturizer and certain low melting ingredients such as chocolate chips can be introduced into the dough in the flour before the flour is heated in the premix. Similarly, fat soluble flavors can be added to the fat.

The dough product of this invention and its mode of preparation will now be further described with reference to the following Examples. All parts and percentages are by weight unless otherwise noted.

EXAMPLE 1

In this Example the flour/fat premix was treated in a batch process.

25 kilograms (kg) vegetable fat were melted at 60° C. in a sealable container and thoroughly mixed with 40 kg wheat flour and 2.7 kg of a mixture of skimmed milk powder (1 kg), egg yolk powder (1 kg), egg white powder (0.4 kg) and salt (0.3 kg).

The container was then sealed and the mixture heated up to 110° C. over a period of 30 minutes. After cooling to 35° C. the mixture was poured into cooling pans and allowed to cool to 18° C. It was then kneaded prior to admixing with the other dough ingredients.

The texturizer comprised 22.5 kg of glucose syrup (containing 80% by weight dissolved solids) to which was added 2.5 kg water. The blend was then placed in a mixer followed by addition of the pretreated flour and fat. The whole mixture was kneaded until it was smooth and homogeneous.

The resulting dough comprised

| | |
|---|---|
| 43% | flour |
| 27% | fat |
| 24% | texturizer |
| 3% | other materials |
| 3% | added water, giving approximately 13% total water |

The dough had a water activity of 0.73, was storage stable for 12 months and could be rolled out into a sheet to bake biscuits (12 minutes at 190° C.) or a pastry case for a pie or tart (45 minutes at 190° C.). Alternatively the dough could be shaped before storage into shapes suitable for subsequent use, such as pie shells.

EXAMPLE 2

The same premix ingredients of Example 1 were vigorously mixed in a continuous mixer before being pumped continuously into a scraped surface heat exchanger at a pressure of 0.5 to 3 bar. The temperature of the premix in the exchanger was raised to 108° C. over a period of about 10 minutes. The premix was next fed continuously to a second scraped surface heat exchanger which acted as a cooler and in which, under a nitrogen atmosphere, the premix was cooled to 25° C. Finally, the premix was blended with the same amount of the same texturizer and with the same amount of water as in Example 1.

The dough was storage stable for more than 12 months and gave baked products of even better qualities than the product of Example 1.

While the invention has been described in conjunction with certain specific embodiments, it is evident that many alternatives, modifications and variations will be apparent to those skilled in the art in light of the foregoing description.

What is claimed is:

1. A process for the production of a storage stable, ready to bake dough composition consisting essentially of:
   (a) forming an essentially homogenous premix of 15 to 60 w/w % flour and 5 to 40 w/w % edible fat;
   (b) heating the premix from (a) to a temperature of from 90° to 145° C.; and
   (c) adding 0.5 to 40 w/w % texturizer and water, so that the total water content is 8 to 16 w/w %.

2. The process of claim 1, wherein the premix is heated under elevated pressure.

3. The process of claim 1, wherein the flour is at least one type selected from the group consisting of rye, rice and maize flour.

4. The process of claim 3, wherein a portion of the flour is replaced by a cereal starch.

5. The process of claim 3, wherein the content of flour in the dough is about 20 to 57.5 w/w %.

6. The process of claim 1, wherein the fat content of the dough is about 10 to 37.5% by weight.

7. The process of claim 1, wherein the texturizer is a polyol.

8. The process of claim 7, wherein the texturizer is a water soluble, monosaccharide, disaccharide or polysaccharide having a degree of polymerization between 3 to 50.

9. The process of claim 8, wherein the texturizer is at least one selected from the group consisting of glycerol, sucrose, glucose, fructose, and starch hydrolysates containing dextrose oligomers having 1 to 30 dextrose units, sorbitol, maltitol, and hydrogenated starch hydrolysates.

10. The process of claim 9, wherein the texturizer is at least one selected from the group consisting of glucose syrup, fructose syrup and honey.

11. The process of claim 1, wherein the amount of the texturizing agent varies from about 10 to 35 w/w %.

12. The process of claim 1, having a water activity of about 0.75 or less.

13. The process of claim 1, wherein the time of heating varies from about 0.1 to 300 minutes.

14. The process of claim 13, wherein the premix is heated in a batch process with a gradual increase in temperature, for about 10 to 100 minutes.

15. The process of claim 13, wherein the premix is heated in a continuous process for a residence time for about 0.1 to 60 minutes.

16. The process of claim 1, wherein the premix is cooled with agitation under an inert gas.

17. The process of claim 1, wherein the texturizer is a water soluble, hydrogenated monosaccharide, disaccharide, or polysaccharide having a degree of polymerization between 3 to 50.

18. The product from the process of claim 1.

19. The process of claim 1, wherein from 0.5 to 15 w/w % water is added to the premix prior to heating in step (b).

* * * * *